US00RE48070E

(19) United States
(12) Reissued Patent
Clow et al.

(10) Patent Number: US RE48,070 E
(45) Date of Reissued Patent: Jun. 30, 2020

(54) SYSTEM FOR CONTAINING A LOAD ON AN OPEN BED

(71) Applicant: 1892575 ALBERTA LTD., Whitecourt (CA)

(72) Inventors: Floyd K. Clow, Whitecourt (CA); Darwin James Sanborn, Mayerthorpe (CA)

(21) Appl. No.: 16/214,175

(22) Filed: Dec. 10, 2018

Related U.S. Patent Documents

Reissue of:
(64) Patent No.: 9,527,422
Issued: Dec. 27, 2016
Appl. No.: 14/836,158
Filed: Aug. 26, 2015

(51) Int. Cl.
*B60P 1/02* (2006.01)
*B61D 45/00* (2006.01)
*B60P 7/135* (2006.01)

(52) U.S. Cl.
CPC ..... *B60P 1/02* (2013.01); *B60P 7/135* (2013.01); *B61D 45/00* (2013.01)

(58) Field of Classification Search
CPC ..... B60P 1/02; B60P 7/0892
USPC ..... 254/5 R, 5 B, 5 C; 410/47, 49, 54, 94, 410/95, 107, 111, 121; 296/26.04, 26.05
See application file for complete search history.

(56) References Cited

U.S. PATENT DOCUMENTS 1,498,763 A * 6/1924 Sunde ..... B61D 3/08 105/387
2,021,503 A 11/1935 Fildes ..... B60P 7/13 410/72
2,831,588 A * 4/1958 Seed ..... B60P 1/6436 414/341
3,048,366 A * 8/1962 Williamson ..... B62B 3/0618 254/5 C
3,313,429 A * 4/1967 Cole ..... B65G 67/20 414/392
4,163,425 A 8/1979 Bedard
4,486,132 A * 12/1984 Schulz ..... B60P 7/13 108/55.1
4,784,547 A * 11/1988 Prinz ..... B60P 7/0892 410/153
4,954,029 A * 9/1990 Durkin ..... B60P 7/13 292/143
5,094,485 A * 3/1992 Lycett ..... B60P 7/13 292/143

(Continued)

FOREIGN PATENT DOCUMENTS

CA 1066561 11/1979
CA 2048791 A1 10/1992

(Continued)

*Primary Examiner* — Russell D Stormer
(74) *Attorney, Agent, or Firm* — Black, McCuskey, Souers & Arbaugh LPA

(57) ABSTRACT

A trailer can include an open bed, a frame, an actuator, and a pin. The open bed can extend a width and a length. The frame can support the open bed. The actuator can be mounted on the frame. The pin can be mounted on the frame along a periphery of the open bed. The pin can be drivable by the actuator in reciprocating movement transverse to the length between a first pin end limit of travel defining a [refracted] *retracted* position and a second pin end limit of travel defining an extended position. The pin can be recessed from the open bed when in the retracted position and extend above the open bed when in the extended position.

16 Claims, 8 Drawing Sheets

(56) References Cited

U.S. PATENT DOCUMENTS

| | | | | |
|---|---|---|---|---|
| 5,156,506 | A | 10/1992 | Bailey | |
| 5,791,844 | A | 8/1998 | Anderson | |
| 5,931,617 | A * | 8/1999 | Kroll | B60P 7/132 410/72 |
| 5,954,465 | A | 9/1999 | Ellerbush | |
| 6,030,158 | A | 2/2000 | Tatina et al. | |
| 7,189,041 | B1 | 3/2007 | Powell | B60P 1/02 410/121 |
| 7,396,069 | B2 | 7/2008 | Oliver | |
| 8,061,953 | B2 * | 11/2011 | Stoeckl | B60R 5/04 224/281 |
| 8,152,425 | B2 | 4/2012 | Hazen | |
| 8,322,957 | B1 | 12/2012 | Pennisi | |
| 2005/0042055 | A1 | 2/2005 | Weir | |
| 2006/0280574 | A1 * | 12/2006 | Becker | B60P 7/0892 410/94 |
| 2007/0116535 | A1 * | 5/2007 | Becker | B60P 7/0892 410/94 |
| 2015/0367769 | A1 * | 12/2015 | Gift | B60P 7/06 296/43 |

FOREIGN PATENT DOCUMENTS

| | | | | |
|---|---|---|---|---|
| CA | 2809530 | A1 | 9/2013 | |
| DE | EP 0042563 | A1 * | 12/1981 | B60P 7/13 |
| GB | 1199594 | A * | 7/1970 | B60P 7/132 |

* cited by examiner

SYSTEM FOR CONTAINING A LOAD ON AN OPEN BED

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Field

The present disclosure relates to relates generally to flatbed or open bed trailers and more specifically to a system for containing a load on the open bed.

2. Description of Related Prior Art

U.S. Pat. No. 7,189,041 discloses a RETRACTABLE LOAD SUPPORT SYSTEM. The retractable load support system is for selectively raising a load from the bed of a trailer for allowing the usage of a forklift for loading and unloading the load. The retractable load support system includes a trailer having a bed, a plurality of openings within the bed, a plurality of supports extendable through the openings, a plurality of support members attached to the supports, and at least one actuator attached to the trailer and the support members for selectively lowering and raising the plurality of supports. A locking bar is extendable through locking apertures within the support members and a support frame of the trailer for locking the supports in a raised position.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A trailer can include an open bed, a frame, an actuator, and a pin. The open bed can extend a width and a length. The frame can support the open bed. The actuator can be mounted on the frame. The pin can be mounted on the frame along a periphery of the open bed. The pin can be drivable by the actuator in reciprocating movement transverse to the length between a first pin end limit of travel defining a [refracted] *retracted* position and a second pin end limit of travel defining an extended position. The pin can be recessed from the open bed when in the retracted position and extend above the open bed when in the extended position.

BRIEF DESCRIPTION OF THE DRAWINGS

The detailed description set forth below references the following drawings.

DETAILED DESCRIPTION

Figure 1:
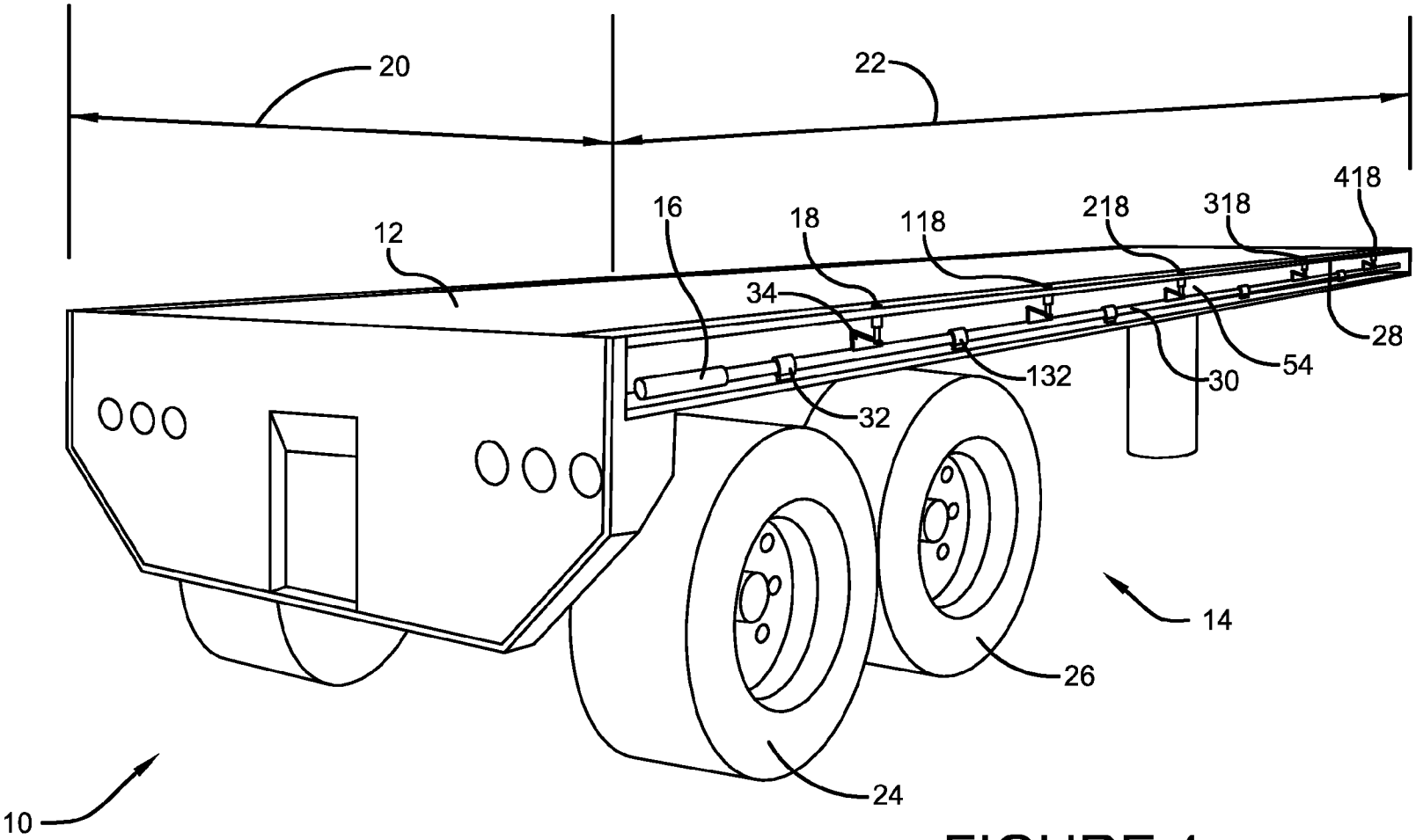
FIG. 1 is a first perspective view of an exemplary embodiment of the present disclosure.

A plurality of different embodiments of the present disclosure is shown in the Figures of the application. Similar features are shown in the various embodiments of the present disclosure. Similar features across different embodiments have been numbered with a common reference numeral and have been differentiated by an alphabetic suffix. Similar features in a particular embodiment have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

A trailer 10 [can include] *is a system for containing a load on an open bed and includes* an open bed 12, a frame 14, an actuator 16, and a pin 18. The open bed 12 can extend a width (referenced at 20) and a length (referenced at 22). The frame 14 can support the open bed 12. Wheels, such as wheels 24 and 26, can be mounted to the frame 14 to allow the trailer 10 to be moved. The trailer 10 can be utilized as an oilfield float trailer.

The actuator 16 can be mounted on the frame 14. The pin 18 can be mounted on the frame 14 along a periphery 28 of the open bed 12. The trailer 10 can include a plurality of pins, including pin 18 as well as pins 118, 218, 318 and 418. Each of the pins 18-418 can be drivable by the actuator 16 in reciprocating movement transverse to the length 22 between a first pin end limit of travel defining a retracted position and a second pin end limit of travel defining an extended position. Each of the pins 18-418 can be recessed from the open bed 12 when in the retracted position and extend above the open bed 12 when in the extended position.

A rod 30 can be operably disposed between the actuator 16 and the pins 18-418. The rod 30 can be drivable in reciprocating rectilinear movement along at least a portion of the length 22 by the actuator 16 between a first rod end limit of travel and a second rod end limit of travel. The rod 30 can be guided and supported in motion by one or more sleeves, such as sleeves 32 and 132, disposed along the length 22.

A cam, such as cam 34, can be mounted on the rod 30 and can be disposed in slidable engagement with the pin 18 to move the pin 18 between the first and second pin end limits of travel. The exemplary embodiment of the present disclosure can include a plurality of cams mounted on the rod 30. Each cam can be disposed in slidable engagement with one of the plurality of pins 18-418 to concurrently move each the plurality of pins 18-418 between respective the first and second pin end limits of travel. The rod 30 can thus extend greater than half of the length 22 to engage all of the pins 18-418.

Figure 4:
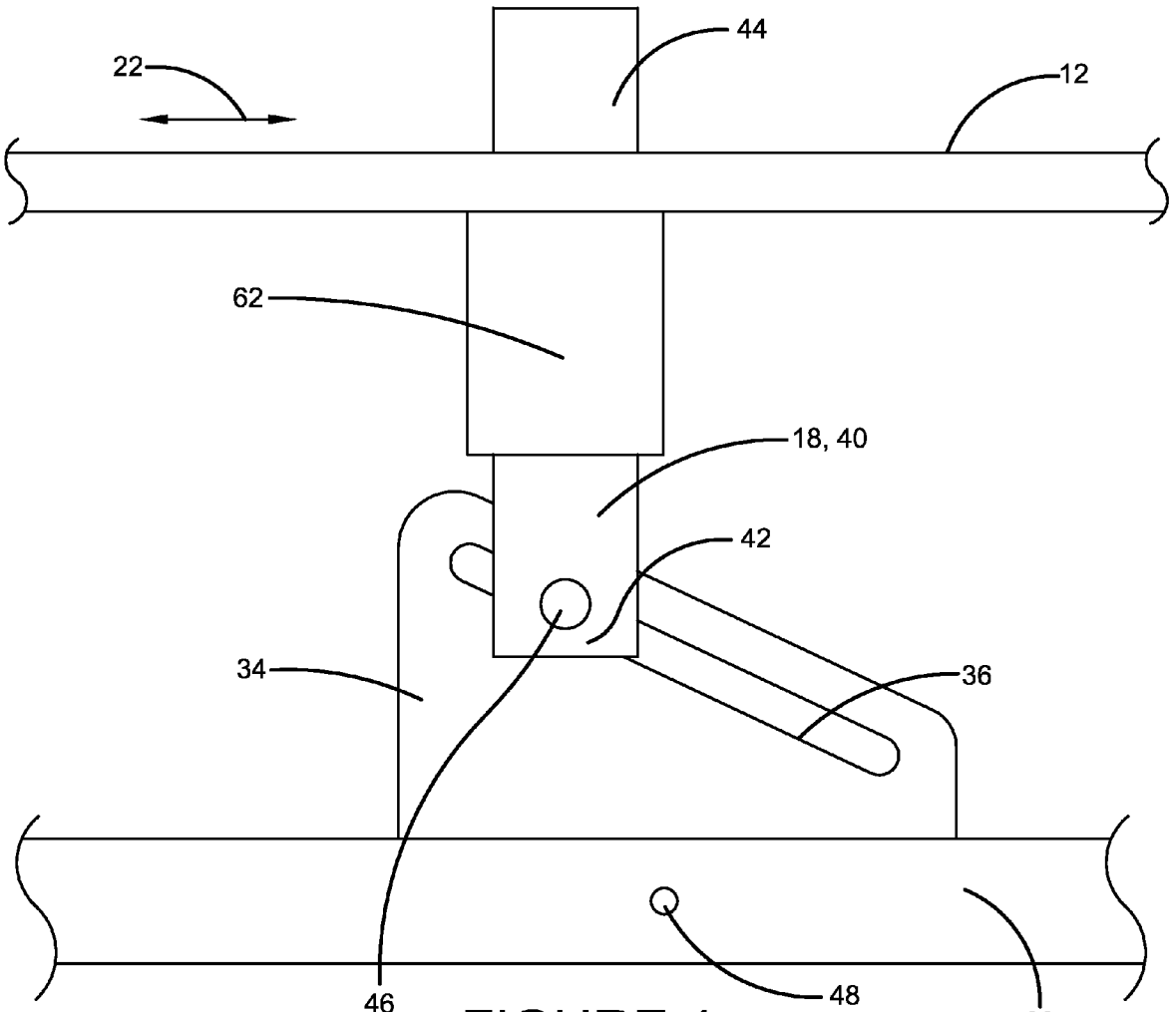
FIG. 4 is a partial side view of an exemplary embodiment of the present disclosure wherein a pin is shown in an extended position.
Figure 5:
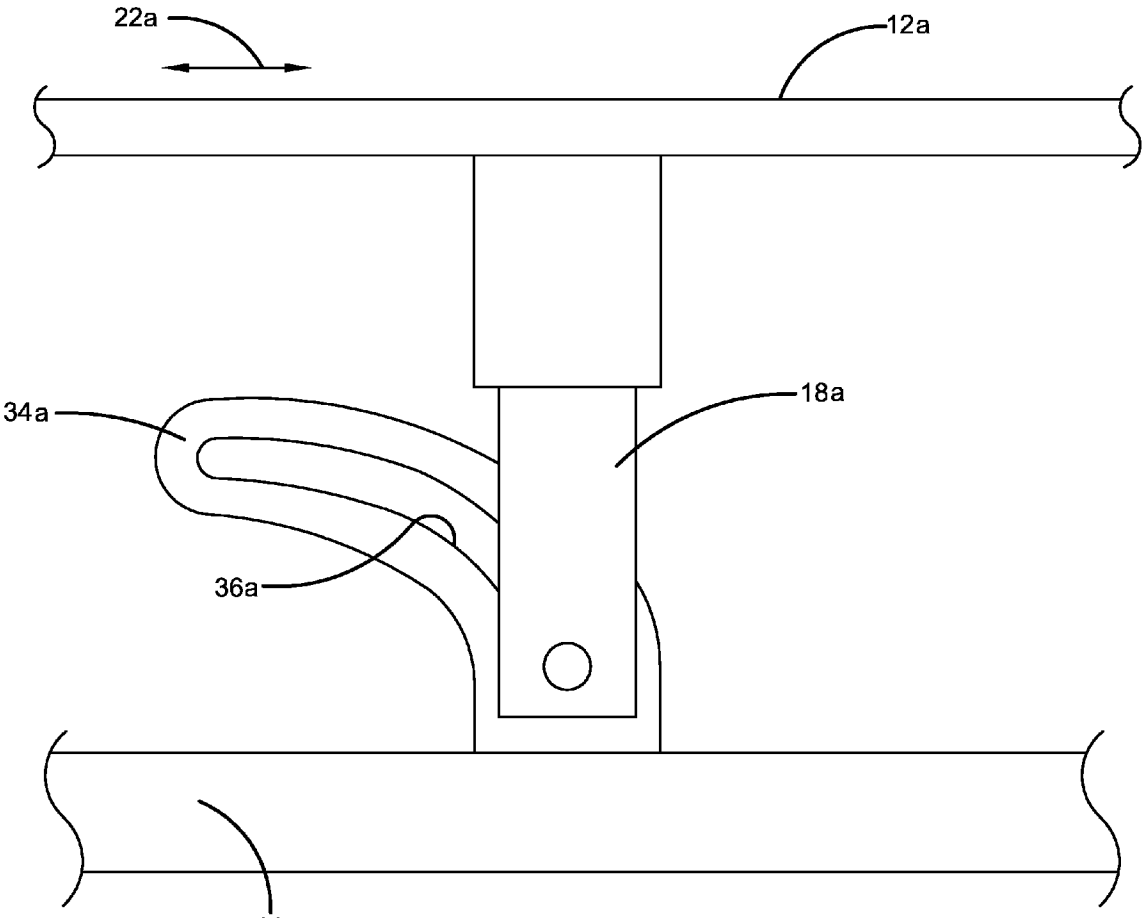
FIG. 5 is a partial side view of an exemplary embodiment of the present disclosure wherein a pin is shown in a retracted position.

Referring now to FIGS. 4 and 5, the exemplary cam 34 can be a generally triangular plate extending away from the rod 30 in a direction transverse to the length 22. The cam 34 can define a sliding surface 36 engaging the pin 18. The sliding surface 36 can be defined by a closed slot 38. The exemplary sliding surface 36 engaging the pin 18 can be straight. The rate of movement transfer between the cam 34 and the pin 18 can therefore be linear.

The exemplary pin 18 can be guided and supported in movement by a sleeve 62 mounted to the frame 14. The exemplary pin 18 can include a first shaft portion 40 extending vertically between a base end 42 and a distal end 44. The distal end 44 can be recessed from or flush with the open bed 12 when the pin 18 is in the retracted position. The distal end 44 can be positioned above the open bed 12 when the pin 18 is in the extended position, as shown in FIG. 4.

Figure 2:
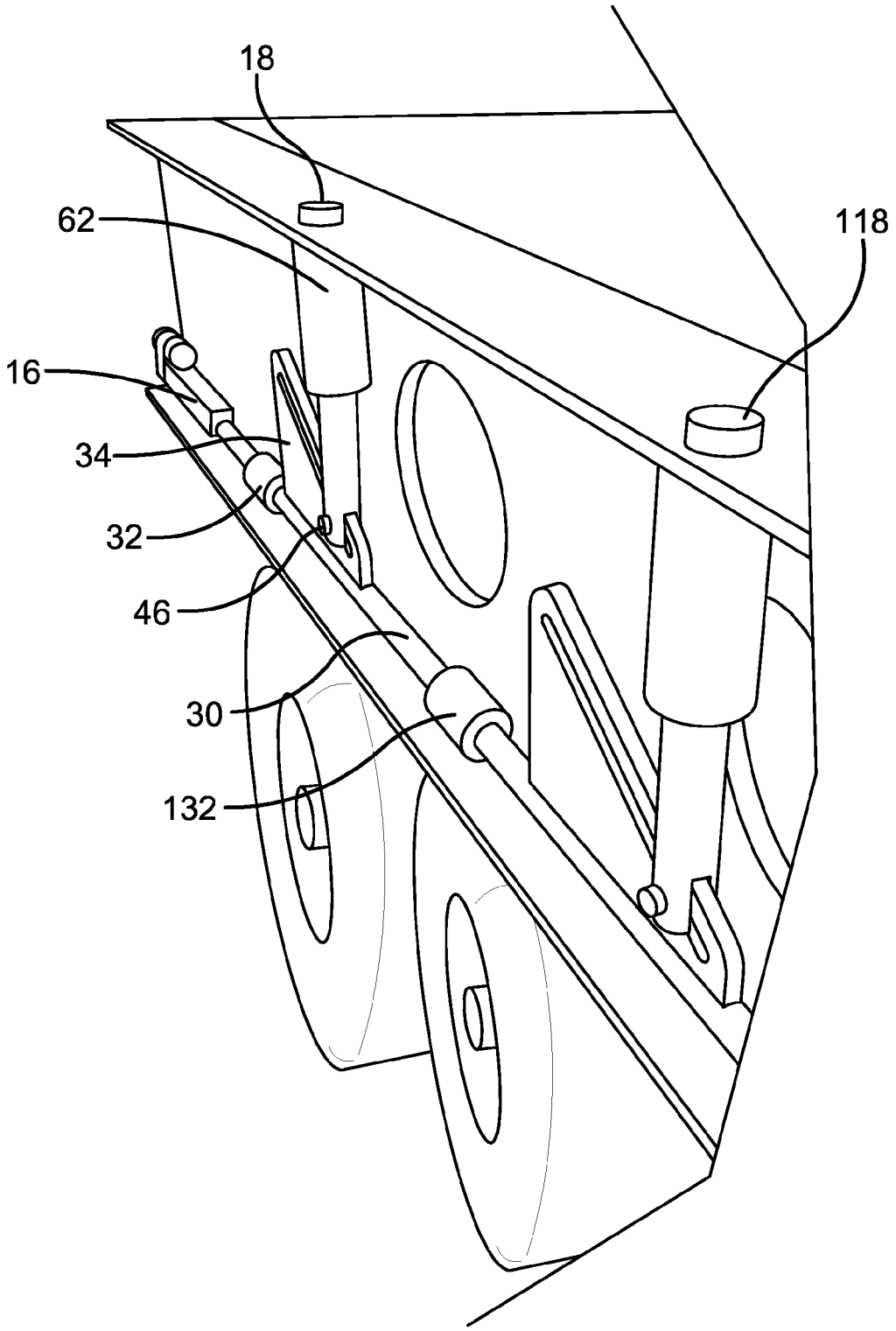
FIG. 2 is a second perspective view of the exemplary embodiment of the present disclosure illustrated in FIG. 1.

The exemplary pin 18 can also include a second shaft portion 46 extending transverse to the first shaft portion 40. The exemplary second shaft portion 46 can be a cross-pin passing through a yoke defined by the base end 42, as best shown in FIG. 2. The second shaft portion 46 can be rotatable relative to the first shaft portion 40 and ride along the sliding surface 36.

Figure 3:
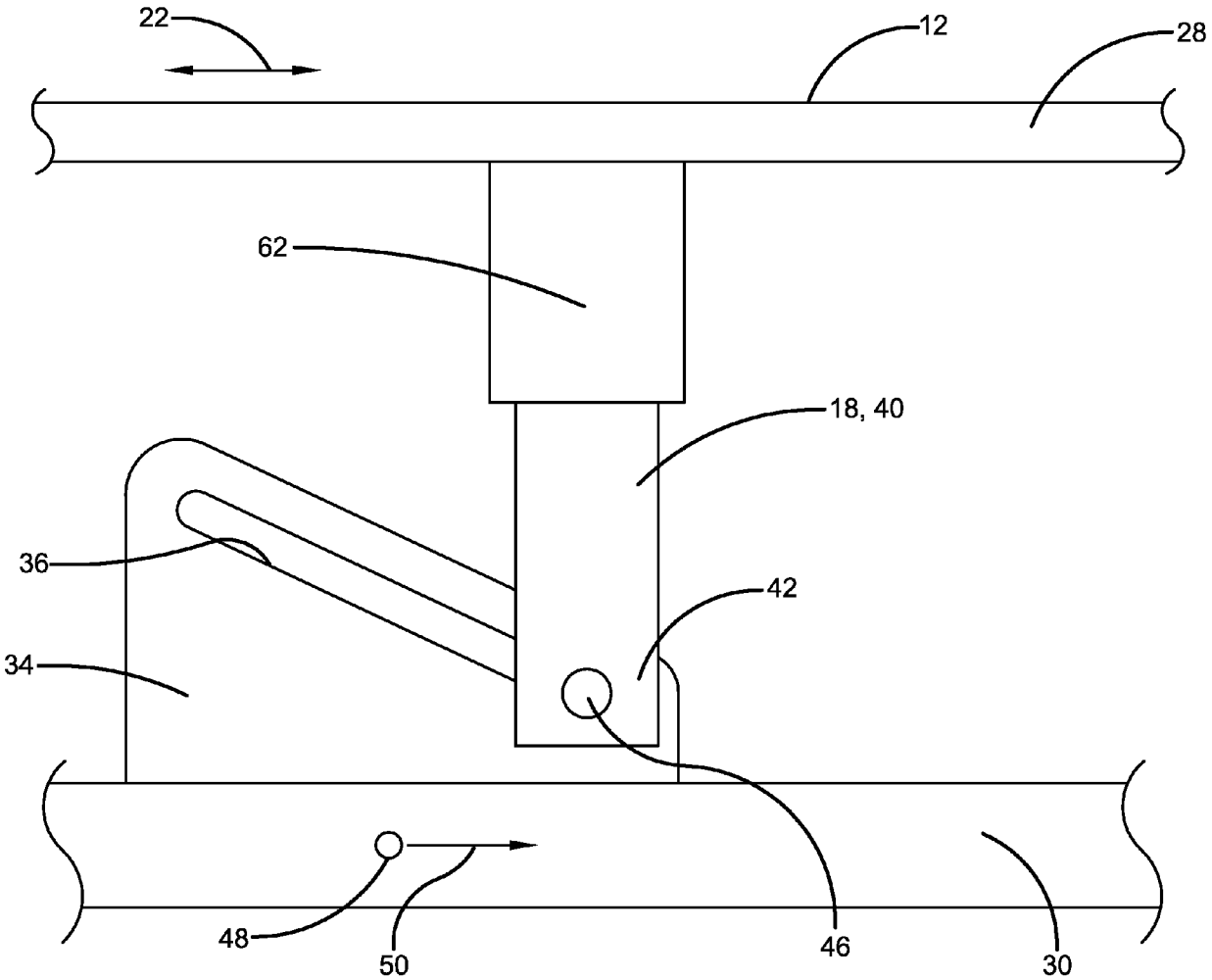
FIG. 3 is a partial side view of an exemplary embodiment of the present disclosure wherein a pin is shown in a retracted position.

FIG. 3 is a partial side view of an exemplary embodiment of the present disclosure wherein the pin 18 is shown in the retracted position and FIG. 4 is a partial side view of an exemplary embodiment of the present disclosure wherein the pin 18 is shown in the extended position. A reference point 48 has been illustrated in FIGS. 3 and 4. The reference point 48 is a fixed point on the rod 30. When the pin 18 is the [refracted] *retracted* position, as shown in FIG. 3, the rod 30 can be moved in the direction referenced at 50, along the length 22. As the rod 30 is moved in the direction 50, the second shaft portion 46 can ride up the sliding surface 36. Further, the second shaft portion 46 can urge the first shaft portion 40 upwardly. When the rod 30 has moved a predetermined amount (as illustrated by the relative positions of the reference point 48 in FIGS. 3 and 4), the pin 18 will have moved from the retracted position to the extended position. When the rod 30 has moved the predetermined amount in a direction opposite to direction 50 (as illustrated by the relative positions of the reference point 48 in FIGS. 4 and 3), the pin 18 will have moved from the extended position to the retracted position.

FIG. 5 illustrates another exemplary embodiment of the present disclosure. A rod 30a can drive a cam 34a to drive a pin 18a between a retracted position (illustrated) and an extended position in which the pin 18a extends above an open bed 12a. The rod 30a can move along a length 22a of the open bed 18a. The cam 34a can define a sliding surface 36a. The cam 34a can be an arcuate plate. The sliding surface 36a can be arcuate. The rate of movement transfer between the cam 34a and the pin 18a can therefore be variable.

Figure 6:
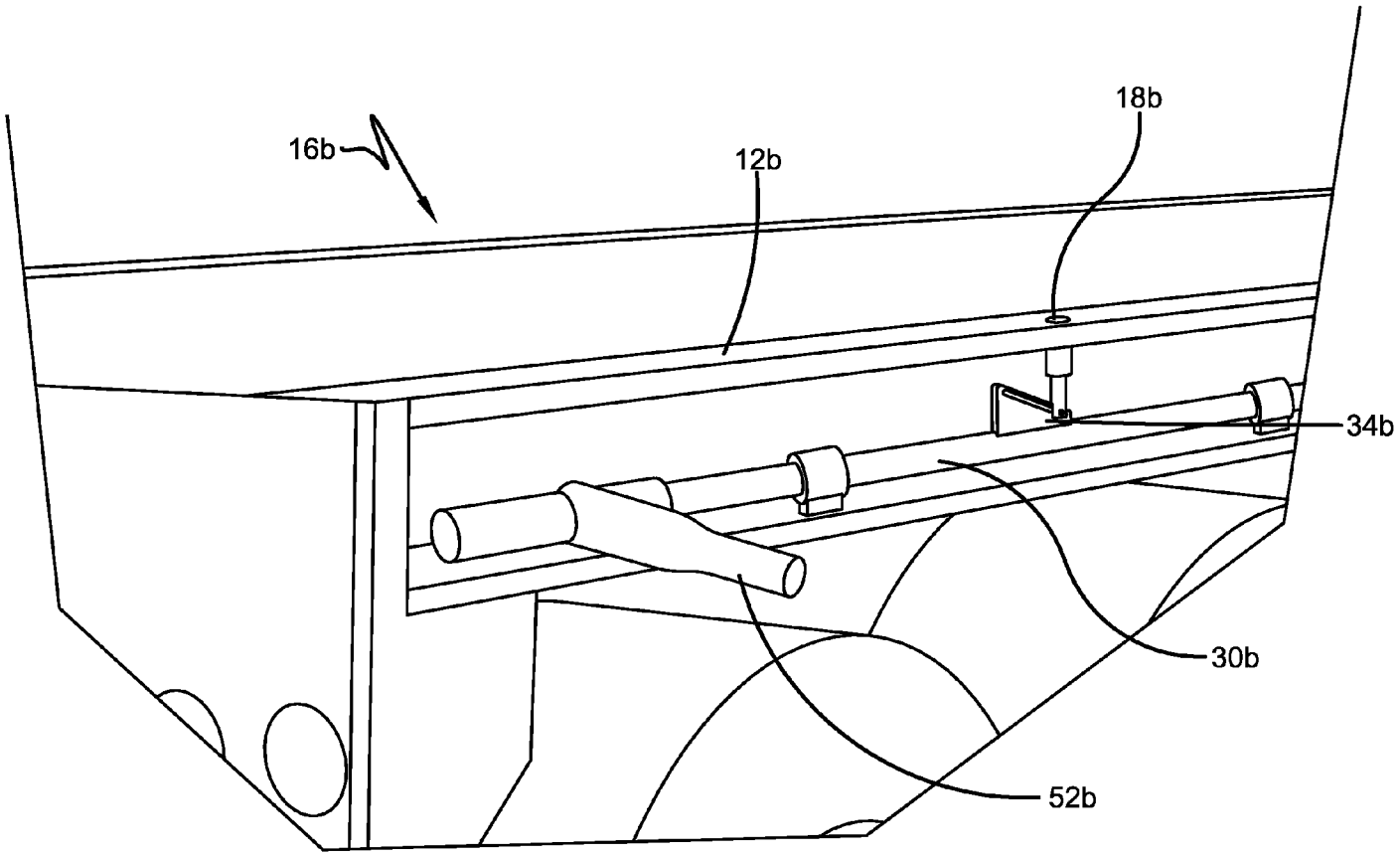
FIG. 6 is a partial perspective view of an exemplary embodiment of the present disclosure.

In FIGS. 1 and 2, the exemplary actuator 16 can include an electronic motor with appropriate gearing to convert rotation to rectilinear movement. Alternatively, the actuator 16 can be a cylinder, such as hydraulic cylinders or pneumatic cylinders. FIG. 6 illustrates another exemplary embodiment of the present disclosure. The actuator 16b can be a purely mechanical arrangement. The actuator 16b can include a lever 52b. The lever 52b can be engageable with gears of the actuator 16b. Cranking of the lever 16b by a user can result in rectilinear movement of a rod 30b to move a cam 34b, to drive a pin 18b between an extended position and a [refracted] *retracted* position relative to an open bed 12b.

It is noted that the actuator 16, rod 30, sleeves 32, 132, and cam 34 are shown exposed in FIGS. 1 and 2, but can be enclosed within the frame 12 in one or more embodiments of the present disclosure. The actuator 16, rod 30, sleeves 32, 132, and cam 34 are shown disposed in a pocket 54 defined by the frame 14 in FIGS. 1 and 2. One or more panels can be releasibly engaged with the frame 14 to shield the actuator 16, rod 30, sleeves 32, 132, and cam 34.

Figure 7:
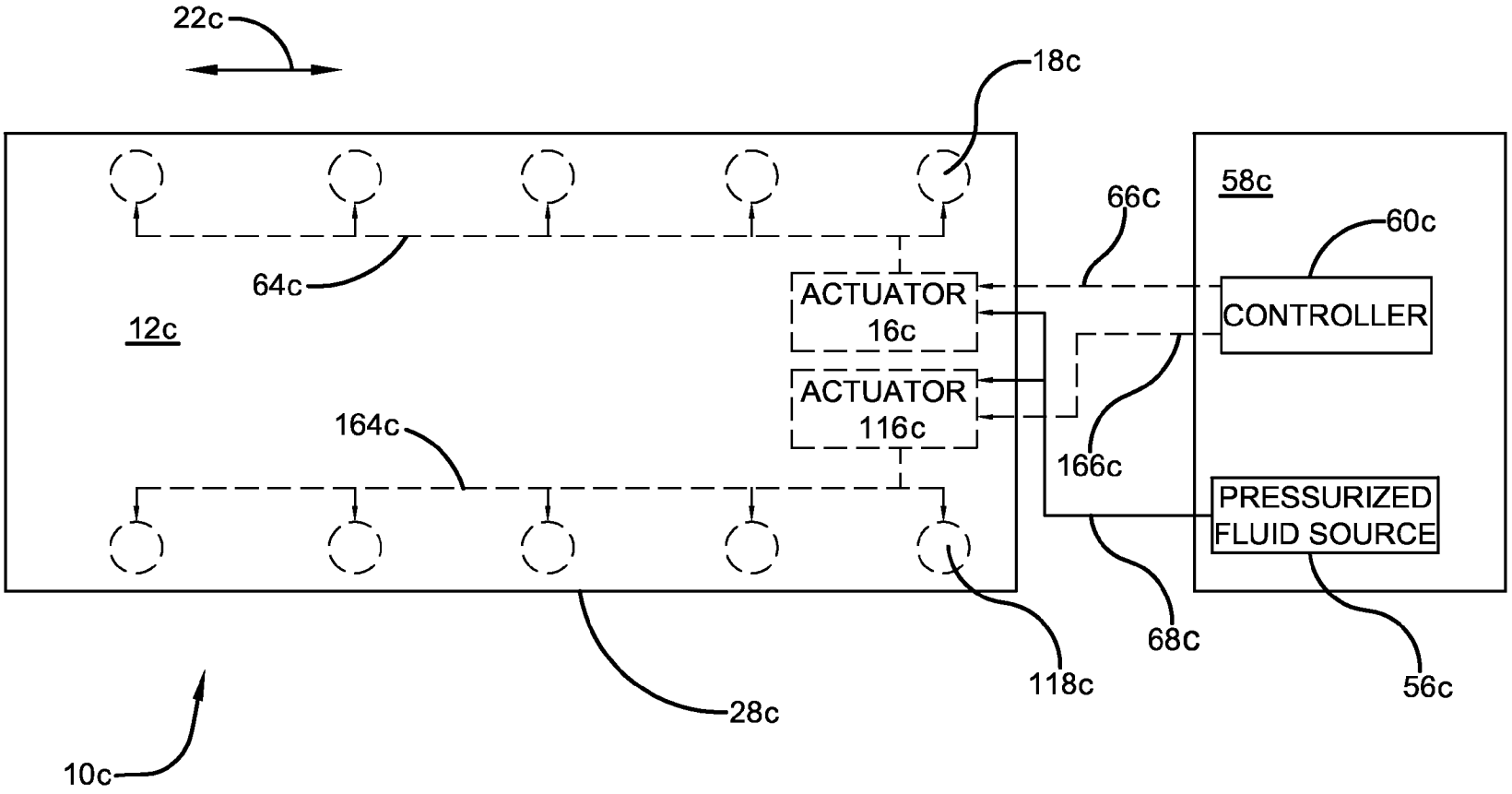
FIG. 7 is a schematic view of an exemplary embodiment of the present disclosure.

FIG. 7 schematically illustrates another exemplary embodiment of the present disclosure. A trailer 10a can include an open bed 12 supported by a frame (not visible). A first actuator 16c can be mounted on a first side of the frame. A second actuator 116c can be mounted on a second side of the frame. A first plurality of pins such as pin 18c can each be mounted on the first side of the frame along a periphery 28a of the open bed 12a and be drivable by the first actuator 16c in reciprocating movement transverse to a length 22c between a first end limit of travel defining a retracted position and a second end limit of travel defining an extended position. A second plurality of pins such as pin 118c can each be mounted on the second side of the frame along the periphery 28a of the open bed 12a and be drivable by the second actuator 116c in reciprocating movement transverse to the length 22c between a first pin end limit of travel defining a retracted position and a second pin end limit of travel defining an extended position.

The exemplary actuators 16c, 116c can be electronically-controlled valves and be connected to a source of pressurized fluid 56c. The source of pressurized fluid 56c can be associated with a tractor/truck 58c operable to pull the trailer 10c. A controller 60c can be operable to control both of the first and second actuators 16c, 116c. The controller 60c can be positioned in the tractor 58c to be operated by a driver of the tractor 58c. The driver can operate the controller 60c through a button, a switch, a knob, through voice commands, or some other modality. The controller 60c can control one or both of the valve-actuators 16c, 116c to open and thereby direct fluid to the pins 18c, 118c and the other pins. Lines 64c, 164c, and 68 represent fluid lines. Lines 66, 166c, represent lines of electrical communication. Each pin can be disposed in a sleeve defining a fluidly sealed chamber. Each pin can thus define a fluid cylinder. The driver can thus control the pins to move to the extended position through the controller 60c.

Figure 8:
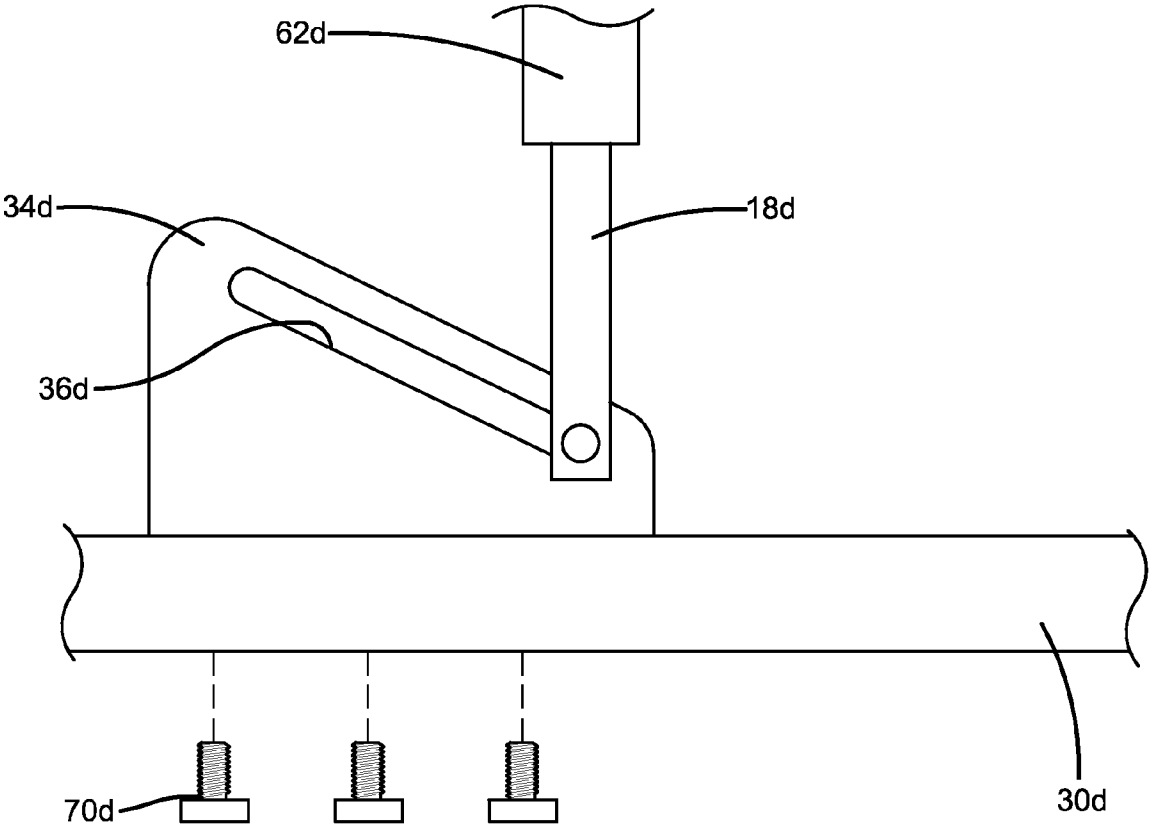
FIG. 8 is a partial side view of an exemplary embodiment of the present disclosure.

FIG. 8 illustrates another exemplary embodiment of the present disclosure. A rod 30d can drive a cam 34d to drive a pin 18d between a retracted position and an extended position. The pin 18d is guided in motion by a sleeve 62d. The cam 34d can define a sliding surface 36d. The cam 34d can be selectively engaged, disengaged and re-engaged with the rod 30d. The cam 34d can be received in a slot in the rod 30d. the slot can define a bottom to prevent the cam 34d from sliding completely through the rod 30d. Apertures can extend through the rod 30d to the bottom of the slot. Additional apertures can be defined in the bottom of the cam 34d. The apertures in the cam 34d can be threaded. The apertures in the cam 34d can be aligned with the apertures in the rod 30d. Threaded fasteners, such as fastener 70d, can be received in the apertures in the rod 30d and threadingly engaged the apertures in the cam 34d to selectively engage the rod 30d and the cam 34d together. This allows the cam

34d to be replaced with another cam if another pattern of movement of the pin 18d is desired.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or subcombinations that are disclosed herein as other present disclosures in other patent documents is hereby unconditionally reserved.

What is claimed is:

1. A trailer comprising:

an open bed extending a width and a length;

a frame supporting said open bed;

an actuator mounted on said frame;

a pin mounted on said frame along a periphery of said open bed and drivable by said actuator in reciprocating movement transverse to said length between a first pin end limit of travel defining a retracted position and a second pin end limit of travel defining an extended position, wherein said pin is recessed from said open bed when in said [refracted] *retracted* position and extends above said open bed when in said extended position; [and]

a rod operably disposed between said actuator and said pin, said rod drivable in reciprocating rectilinear movement along at least a portion of said length by said actuator between a first rod end limit of travel and a second rod end limit of travel*;*

*a cam mounted on said rod and disposed in slidable engagement with said pin to move said pin between said first and second pin end limits of travel; and*

*wherein said pin further comprises:*

*a first shaft portion extending vertically between a base end and a distal end wherein said distal end is one of recessed from or flush with said open bed when said pin is in said retracted position and is positioned above said open bed when said pin is in said extended position; and*

*a second shaft portion extending transverse to said first shaft portion.*

[2. The trailer of claim 1 further comprising:

a cam mounted on said rod and disposed in slidable engagement with said pin to move said pin between said first and second pin end limits of travel.]

3. The trailer of claim [2] *1* wherein said cam further comprises an arcuate sliding surface engaging said pin.

4. The trailer of claim [2] *1* wherein said cam further comprises a straight sliding surface engaging said pin.

5. The trailer of claim [2] *1* wherein said cam is further defined as a plate extending away from said rod in a direction transverse to said length.

6. The trailer of claim 5 wherein said plate is further defined as triangular.

7. The trailer of claim 5 wherein said plate is further defined as arcuate.

[8. The trailer of claim 2 wherein said pin further comprises:

a first shaft portion extending vertically between a base end and a distal end wherein said distal end is one of recessed from or flush with said open bed when said pin is in said retracted position and is positioned above said open bed when said pin is in said extended position; and a second shaft portion extending transverse to said first shaft portion.]

9. The trailer of claim [8] *1* wherein said cam further comprises:

a sliding surface engaged with said second shaft portion.

10. The trailer of claim 9 wherein said sliding surface is defined by a closed slot.

11. The trailer of claim [2] *1* wherein said cam is selectively engageable, disengageable, and re-engageable with said rod.

12. The trailer of claim 1 wherein said actuator further comprises:

an electronic motor.

13. The trailer of claim 1 wherein actuator further comprises one of an hydraulic cylinder and a pneumatic cylinder.

14. The trailer of claim 1 wherein said actuator further comprises:

a lever.

15. A trailer comprising:

an open bed extending a width and a length;

a frame supporting said open bed;

an actuator mounted on said frame;

a plurality of pins each mounted on said frame along a periphery of said open bed and drivable by said actuator in reciprocating movement transverse to said length between a first pin end limit of travel defining a [refracted] *retracted* position and a second pin end limit of travel defining an extended position, wherein each of said plurality of pins is recessed from said open bed when in said retracted position and extends above said open bed when in said extended position; [and]

a rod operably disposed between said actuator and all of said plurality of pins, said rod drivable in reciprocating rectilinear movement along at least a portion of said length by said actuator between a first rod end limit of travel and a second rod end limit of travel*;*

*a plurality of cams mounted on said rod and each disposed in slidable engagement with one of said plurality of pins to concurrently move each said plurality of pins between respective said first and second pin end limits of travel; and*

*wherein at least one of said plurality of pins further comprises:*

*a first shaft portion extending vertically between a base end and a distal end wherein said distal end is one of recessed from or flush with said open bed when said pin is in said retracted position and is positioned above said open bed when said pin is in said extended position; and*

*a second shaft portion extending transverse to said first shaft portion.*

[16. The trailer of claim 15 further comprising:

a plurality of cams mounted on said rod and each disposed in slidable engagement with one of said plurality of pins to concurrently move each said plurality of pins between respective said first and second pin end limits of travel.]

17. The trailer of claim [16] *15* wherein said rod extends greater than half of said length.

18. A trailer comprising:

an open bed extending a width and a length;

a frame supporting said open bed;

a first actuator mounted on a first side of said frame;

a second actuator mounted on a second side of said frame;

a first plurality of pins each mounted on said first side of said frame along a periphery of said open bed and drivable by said first actuator in reciprocating movement transverse to said length between a first end limit of travel defining a retracted position and a second end limit of travel defining an extended position, wherein each of said first plurality of pins is recessed from said open bed when in said retracted position and extends above said open bed when in said extended position;

a second plurality of pins each mounted on said second side of said frame along said periphery of said open bed and drivable by said second actuator in reciprocating movement transverse to said length between a first pin end limit of travel defining a retracted position and a second pin end limit of travel defining an extended position, wherein each of said second plurality of pins is recessed from said open bed when in said retracted position and extends above said open bed when in said extended position;

a first rod operably disposed between said first actuator and all of said first plurality of pins, said first rod drivable in reciprocating rectilinear movement along at least a portion of said length by said first actuator between a first rod first end limit of travel and a first rod second end limit of travel;

a second rod operably disposed between said second actuator and all of said second plurality of pins, said second rod drivable in reciprocating rectilinear movement along at least a portion of said length by said second actuator between a second rod first end limit of travel and a second rod second end limit of travel;

*a plurality of cams mounted on said first rod and each disposed in slidable engagement with one of said first plurality of pins to concurrently move each said plurality of pins between respective said first and second pin end limits of travel;*

*wherein at least one of said first plurality of pins further comprises:*

*a first shaft portion extending vertically between a base end and a distal end wherein said distal end is one of recessed from or flush with said open bed when said pin is in said retracted position and is positioned above said open bed when said pin is in said extended position; and*

*a second shaft portion extending transverse to said first shaft portion;* and a controller controlling both of said first and second actuators.

*19. A system for containing a load comprising:*

*an open bed extending a width and a length;*

*a frame supporting said open bed;*

*an actuator mounted on said frame;*

*a pin mounted on said frame along a periphery of said open bed and drivable by said actuator in reciprocating movement transverse to said length between a first pin end limit of travel defining a retracted position and a second pin end limit of travel defining an extended position, wherein said pin is recessed from said open bed when in said retracted position and extends above said open bed when in said extended position;*

*a rod operably disposed between said actuator and said pin, said rod drivable in reciprocating rectilinear movement along at least a portion of said length by said actuator between a first rod end limit of travel and a second rod end limit of travel;*

*a cam mounted on said rod and disposed in slidable engagement with said pin to move said pin between said first and second pin end limits of travel;*

*wherein said pin further comprises:*

*a first shaft portion extending vertically between a base end and a distal end wherein said distal end is one of recessed from or flush with said open bed when said pin is in said retracted position and is positioned above said open bed when said pin is in said extended position; and*

*a second shaft portion extending transverse to said first shaft portion.*

* * * * *